United States Patent
Edpalm

(10) Patent No.: US 10,142,528 B2
(45) Date of Patent: Nov. 27, 2018

(54) METHOD FOR CONTROLLING AN INFRARED CUT FILTER OF A VIDEO CAMERA

(71) Applicant: Axis AB, Lund (SE)

(72) Inventor: Viktor Edpalm, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/824,160

(22) Filed: Nov. 28, 2017

(65) Prior Publication Data

US 2018/0152606 A1    May 31, 2018

(30) Foreign Application Priority Data

Nov. 29, 2016 (EP) .................................. 16201140

(51) Int. Cl.
| | | |
|---|---|---|
| H04N 5/225 | (2006.01) | |
| H04N 19/107 | (2014.01) | |
| H04N 5/232 | (2006.01) | |
| H04N 5/235 | (2006.01) | |
| H04N 19/159 | (2014.01) | |
| H04N 19/114 | (2014.01) | |
| H04N 19/149 | (2014.01) | |
| H04N 5/238 | (2006.01) | |

(52) U.S. Cl.
CPC ........... *H04N 5/2254* (2013.01); *H04N 5/232* (2013.01); *H04N 5/2351* (2013.01); *H04N 5/23206* (2013.01); *H04N 5/23245* (2013.01); *H04N 19/107* (2014.11); *H04N 19/159* (2014.11); *H04N 5/238* (2013.01); *H04N 19/114* (2014.11); *H04N 19/149* (2014.11)

(58) Field of Classification Search
CPC .. H04N 5/2254; H04N 5/232; H04N 5/23206; H04N 5/23245; H04N 5/2351; H04N 19/107; H04N 19/159; H04N 19/114; H04N 19/149
See application file for complete search history.

(56) References Cited

U.S. PATENT DOCUMENTS

| | | | |
|---|---|---|---|
| 8,837,576 B2 | 9/2014 | Liang et al. | |
| 2005/0169371 A1 | 8/2005 | Lee et al. | |
| 2006/0245623 A1* | 11/2006 | Loiacono | A61B 5/1171 |
| | | | 382/117 |
| 2007/0160128 A1 | 7/2007 | Tian et al. | |
| 2010/0124274 A1 | 5/2010 | Cheok et al. | |
| 2015/0138368 A1 | 5/2015 | Suzuki et al. | |

(Continued)

FOREIGN PATENT DOCUMENTS

EP    2 727 330    1/2013

OTHER PUBLICATIONS

EP 16201140.7 European Search Report (dated May 31, 2017).

*Primary Examiner* — Antoinette T Spinks
(74) *Attorney, Agent, or Firm* — Volpe and Koenig, P.C.

(57) ABSTRACT

There is provided a method for controlling an infrared cut, IR-cut, filter of a video camera. An indication to switch state of the IR-cut filter of the video camera is received, and a switch of state of the IR-cut filter is synchronized with a video encoding of frames captured by the video camera, such that the IR-cut filter is controlled to switch state when the video camera is about to capture a frame which is a predetermined number of frames before a frame which is scheduled to be encoded as an intra-frame.

15 Claims, 3 Drawing Sheets

(56) References Cited

U.S. PATENT DOCUMENTS

| | | | |
|---|---|---|---|
| 2015/0256722 A1* | 9/2015 | Haga | H04N 5/23206 348/164 |
| 2015/0256766 A1* | 9/2015 | Fujita | H04N 5/23206 348/164 |
| 2017/0078591 A1* | 3/2017 | Petrov | H04N 5/332 |

* cited by examiner

METHOD FOR CONTROLLING AN INFRARED CUT FILTER OF A VIDEO CAMERA

FIELD OF INVENTION

The present teachings relate to the field of video cameras. In particular, it relates to control of an infrared cut filter of a video camera.

BACKGROUND

There are video cameras which offer both day and night functionality. Such cameras are designed to be used in outdoor installations or in indoor environments with poor lighting. When in day mode, i.e., when the light in the scene is above a certain level, the camera delivers colour images. As light diminishes below the certain level, the camera automatically switches to night mode to make use of near infrared (IR) light to deliver high-quality black and white images.

Near-infrared light, which spans from 700 nm up to about 1000 nm, is beyond what the human eye can see, but most camera sensors can detect it and make use of it. When in day mode, the camera uses an IR-cut filter which filters out IR light such that it does not distort the colours of the images as the human eye sees them. When the camera is in night mode, the IR-cut filter is removed, thereby allowing the light sensitivity of the camera to reach down to 0.001 lux or lower.

US patent application with publication number US 2015/138368 A1 relates to an imaging apparatus having an IR-cut filter which may be inserted and removed from an optical path of an imaging optical system depending on a measured brightness value.

When the IR-cut filter changes state, i.e., is turned on or off, there will be a sudden change in the video captured by the camera, partially due to the introduction or removal of colours, and partially since objects look different in the visible spectrum compared to the IR spectrum. This change will not only affect the appearance of the video, but it will also have impact on the efficiency and quality of the encoding of the video.

Known video coding techniques, such as MPEG-4 and 11.264, use interframe prediction to reduce video data between a series of frames. This involves techniques such as difference coding, where one frame is compared with a reference frame and only pixels that have changed with respect to the reference frame are coded, and block-based motion compensation, where a new frame can be predicted block by block by looking for a matching block in a reference frame.

With interframe prediction, each frame is classified as a certain type of frame, such as an intra-frame (sometimes referred to as an I-frame, e.g., in 11.264) or an inter-frame (sometimes referred to as a P-frame or B-frame, e.g., in 11.264). An intra-frame is a self-contained frame that can be independently decoded without any reference to other images. In particular, when encoding intra-frames, the luminance and chrominance channels are encoded by exploiting the spatial redundancy of the pixels in a given channel of a single frame via prediction, transform, and entropy coding. This is in contrast to an inter-frame which makes references to parts of an earlier intra-frame and/or inter-frame(s) to code the frame. When encoding inter-frames, temporal redundancy between separate frames is exploited, and the encoding relies on a motion-compensation prediction technique that predicts parts of a frame from one or more previous frames by encoding the motion in pixels from one frame to another for selected blocks of pixels.

The first frame of the video after the IR-cut filter has changed state will be very different from the preceding frames. Consequently, if the first frame after the IR-cut filter has changed state is encoded with reference to the preceding frames, i.e., is encoded as an inter-frame, the resulting encoded frame will be very large. Also, it will constitute a poor reference image that will linger until the next intra-frame is generated, thereby affecting the efficiency and quality of the encoded video until the next intra-frame is generated. There is thus room for improvements.

European patent application with publication number EP 2727330 A1 relates to adjusting imaging parameters of a video camera, such as exposure and color balance, depending on encoding properties of a video encoder coupled to the video camera. The encoding properties may include an indication of which image in a video sequence is to be compressed into the next intra-coded image.

SUMMARY

In view of the above, it is thus an object of the present disclosure to reduce the impact of the IR-cut filter on the efficiency and quality of the encoding of the video.

According to a first aspect, the above object is achieved by a method, performed in a video camera, for controlling an infrared cut, IR-cut, filter of the video camera, comprising: receiving an indication to switch state of an IR-cut filter of the video camera, wherein the IR-cut filter is switchable between an ON state in which it filters out infrared light and an OFF state in which it does not filter out infrared light; and synchronizing a switch of state of the IR-cut filter with a video encoding of frames captured by the video camera, such that the IR-cut filter is controlled to switch state when the video camera is about to capture a frame which is a predetermined number of frames before a frame which is scheduled to be encoded as an intra-frame.

With this arrangement, the switching of the state of the IR-cut filter is synchronized with the encoding of the frames captured by the camera. In particular, the control of the IR-cut filter is based on when the next intra-frame is to be encoded. In this way, the IR-cut filter is controlled to switch state at a moment when it has a low impact on the efficiency and quality of the encoding the frames.

By IR-cut filter is meant a filter that filters out infrared light.

By the IR-cut filter switching state is meant that it is either turned on, i.e., activated to filter out infrared light, or turned off, i.e., activated to not filter out infrared light. For example, the IR-cut filter may be a physical filter which switches states by switching position in relation to the image sensor of the camera.

By an intra-frame is meant a self-contained frame which is independently encoded without any reference to other images. This is in contrast to an inter-frame which is encoded by making reference to an earlier intra-frame and/or inter-frame(s). In the H.264 standard, intra-frames are referred to as I-frames. Examples of inter-frames in the H.264 standard are P-frames (predicted frames) or B-frames (bi-directional predicted frames).

The predetermined number of frames may be zero, such that the IR-cut filter is controlled to switch state when the video camera is about to capture a frame which is scheduled to be encoded as an intra-frame. In this way, the first frame to be encoded after the IR-cut filter changes state is encoded as an intra-frame. This improves the coding efficiency and quality since one avoids the situation described above where the first frame after the switch is encoded as an inter-frame.

Different parameter settings are preferred, or even optimal, for capturing image frames and processing the captured image frames depending on whether the IR-cut filter is in a first state or in a second state. For example, there may be different preferred values of exposure, focus, and white balance. As the IR-cut filter switches from the first to the second state, there is an abrupt change in the light conditions at the camera sensor, which causes the camera to automatically adjust its parameter settings in order to adapt to the new conditions. Typically, however, it takes some time for the parameters to settle. As long as the parameters have not settled, there will be variations in the video caused by the frames being captured and/or processed using fluctuating parameters which are in a transient state. These variations are visible in the video and increase the risk of encoding artifacts.

The settling time of the parameters is undesirable in case the first frame after the IR-cut filter changes state is encoded as an intra-frame. The reason for this is that the intra-frame will be a poor reference frame for the following frames to be encoded as inter-frames due to the variations between frames caused by the fluctuating parameters.

In order to resolve this problem, the method may, upon switching state of the IR-cut filter from a first to a second state, change at least one of image capturing parameters and image signal processing parameters of the video camera from a first predefined set of values, associated with the first state, to a second predefined set of values associated with the second state. The first state is one of the ON state and the OFF state, and the second state is the other one of the ON state and the OFF state. By changing the parameters upon switching state of the IR-cut filter, the parameter settings may directly be changed from a set of values which is preferred for the first state, to a set of values which is preferred for the second state. In this way, the problem with the settling time of the parameters is removed, and, consequently, the intra-frame will serve as a good reference for the following frames.

The first and the second predefined set of values may include parameters relating to at least one of exposure, focus, and white balance. The values of these parameters are typically affected by IR light.

Another way of approaching the problem relating to the settling time of the parameters in connection to switching state of the IR-cut filter is to control the IR-cut filter to switch state a time period, corresponding to a predefined number of frames, before the next scheduled intra-frame, such that the parameters have time to settle before the next scheduled intra-frame is captured. More specifically, the predetermined number of frames may be greater or equal to one.

Further, during that time period, as few bits as possible may be spent on encoding the frames between the switch of the IR-cut filter and the next scheduled intra-frame. The method may therefore further comprise: encoding the frames captured by the video camera into a bitstream, such that the bitstream comprises no encoded differences for the predetermined number of frames before the frame which is scheduled to be encoded as an intra-frame. This may be achieved by, e.g., not updating memory buffers in the encoder between the frame which immediately precedes the switch in state of the IR-cut filter and the frame which is scheduled to be encoded as an intra-frame.

This may also be achieved by encoding each of the predetermined number of frames before the frame which is scheduled to be encoded as an intra-frame as being identical to a frame which immediately precedes the switch in state of the IR-cut filter. In this way, the video is "freezed" during the time period when the parameters settle. The parameter adjustment carried out during the time period is therefore not visible in the video, and any encoding artifacts stemming therefrom are thereby removed.

This may be, e.g., be achieved by sending empty frames. Alternatively, the predetermined number of frames before the frame which is scheduled to be encoded as an intra-frame may be encoded as P-skip frames. A P-skip frame is a frame which only includes P-skip macroblock. In practice, a P-skip frame is a frame for which only header-information, including e.g. frame number, but no data is sent in the bitstream.

The encoding of the frames follows a group of pictures, GOP, structure. A GOP structure specifies the order in which intra- and inter-frames are arranged. Each GOP starts with an intra-frame which is followed by inter-frames. The number of frames in a GOP is generally referred to as a GOP length. The GOP may have a fixed length, or it may be set dynamically depending on the amount of motion in the video. However, in either case, the GOP structure is known by the encoder a number of frames in advance.

The step of synchronizing may comprise determining when an intra-frame is scheduled to be encoded based on a GOP structure used when encoding images captured by the camera. From the GOP structure, one may thus determine when the next intra-frame is due, and based on that knowledge one may control when to switch state of the IR-cut filter.

The step of synchronizing may comprise: identifying a frame which is the predetermined number of frames before the frame which is scheduled to be encoded as an intra-frame, and switching state of the IR-cut filter when the camera is about to capture the frame identified as being the predetermined number of frames before the frame which is scheduled to be encoded as an intra-frame.

The indication to switch a state of the IR-cut filter may be generated in various ways. For example, the step of receiving an indication to switch a state of an IR-cut filter of the video camera may be responsive to a detection of a change in lighting conditions in a scene of which the video camera captures images. In this way, the camera may automatically detect that there is a change in lighting conditions, and in response thereto generate the indication to switch a state of the IR-cut filter.

The change in lighting conditions may be detected based on changes in brightness of images captured by the video camera. Alternatively, or additionally, the change in lighting conditions may be detected by means of a light sensor, which is either separate from or included in the camera. Alternatively, or additionally, the change in lighting conditions may be detected by means of a timer which, for instance, keeps track of when the sun rises and sets, or when the light is turned on and off in a building.

The step of receiving an indication to switch a state of an IR-cut filter of the video camera may be responsive to detecting an event in images captured by the video camera. For example, the event may be that a person becomes visible in the images captured by the camera.

According to further example, the indication to switch a state of an IR-cut filter of the video camera may be responsive to a user input, e.g., by an operator.

According to a second aspect, the above object is achieved by a controller for controlling an infrared cut, IR-cut, filter of a video camera, comprising: a receiver configured to receive an indication to switch a state of an IR-cut filter of the video camera, wherein the IR-cut filter is switchable between an ON state in which it filters out infrared light and an OFF state in which it does not filter out infrared light; and a processor configured to synchronize a switch of state of the IR-cut filter with a video encoding of frames captured by the video camera, such that the IR-cut filter is controlled to switch state when the video camera is about to capture a frame which is a predetermined number of frames before a frame which is scheduled to be encoded as an intra-frame.

According to a third aspect, the above object is achieved by a video camera comprising: an image sensor, an infrared cut, IR-cut, filter adapted to switch state so as to either prevent or not prevent IR light from reaching the image sensor, a video encoder configured to encode images captured by the video camera using the image sensor, and a controller according to the second aspect for controlling the IR-cut filter.

According to a fourth aspect, the above object is achieved by a non-transitory computer readable medium having computer code instructions stored thereon which, when executed by a device having processing capabilities, are adapted to perform the method of the first aspect.

The second, third, and fourth aspects may generally have the same features and advantages as the first aspect. It is further noted that the disclosure relates to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

A more detailed understanding may be had from the following description, given by way of example in conjunction with the accompanying drawings where.

DETAILED DESCRIPTION

The teachings of the disclosure will now be described more fully hereinafter with reference to the accompanying drawings, in which embodiments are shown. The teachings of this disclosure may, however, be embodied in many different forms and should not be construed as limited to the embodiments set forth herein; rather, these embodiments are provided for thoroughness and completeness, and to fully convey the scope of the disclosure to the skilled person.

Figure 1:
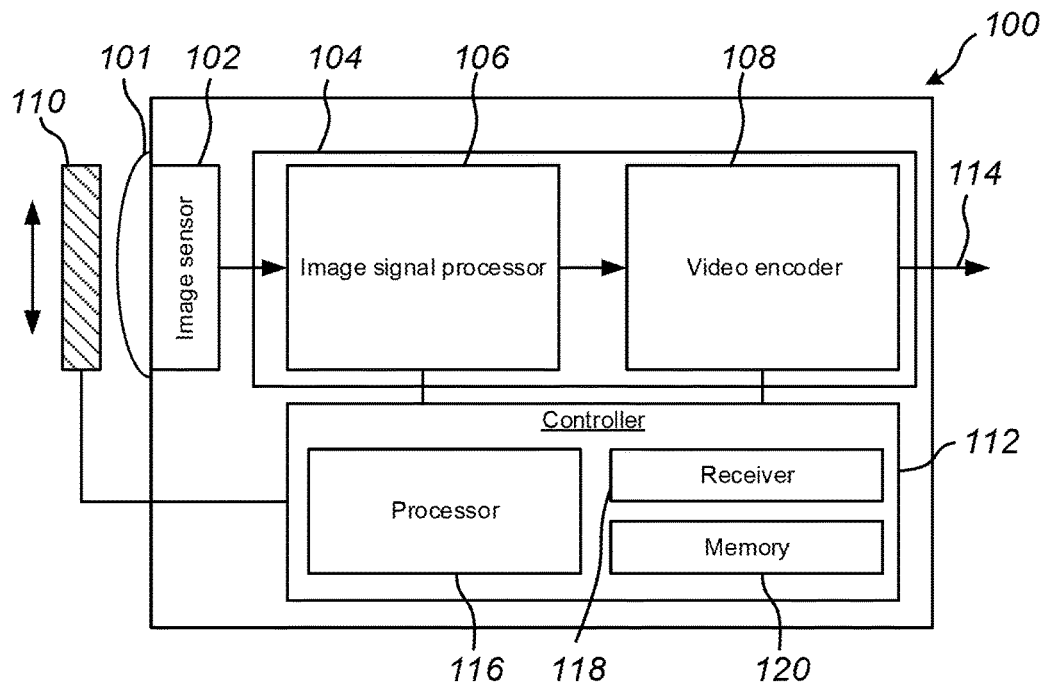
FIG. 1 is a schematic illustration of a video camera according to embodiments.

FIG. 1 illustrates a video camera 100. The video camera 100 comprises an optical system 101, an image sensor 102, and an image pipeline 104. The image pipeline 104 comprises an image signal processor 106 and a video encoder 108. The video camera 100 further comprises an IR-cut filter 110, and a controller 112 for controlling the IR-cut filter 110.

Generally, the video camera 100 may, by means of the optical system 101, and the image sensor 102, capture a stream of images of a scene. The images in the stream are referred to as frames. The capturing of the stream of images is associated with parameters, such as exposure and focus, which control the optical system 101 and/or the image sensor 102 and which therefore affect the resulting images. These parameters are referred to as image capturing parameters herein. The video camera 100 may implement algorithms which automatically adapt the values of the image capturing parameters to the conditions in the scene, and, in particular, to the current light conditions in the scene. For example, the video camera 100 may implement auto-focus and/or auto-exposure algorithms.

The stream of images captured by the camera is then processed by the image pipeline 104. In more detail, the stream of images may be subject to various kinds of image processing by the image signal processor 106 as is known in the art, including processing which adjusts the colours in the images, such as white balance correction. The processing carried out by the image signal processor 106 is associated with parameters, referred to herein as image signal processing parameters, which affect the image processing of the stream of images. For instance, there may be a white balance parameter which is associated the white balance correction carried out by the image signal processor 106. Similar to the image capturing parameters, also parameters of the image signal processing, such as white balance, are automatically adjusted by the camera 100.

Downstream of the image signal processor 106 in the image pipeline 104 is the video encoder 108. The video encoder 108 encodes the captured and processed image stream so as to output a bitstream 114 for transmittal to a decoder over a network. As is known in the art, the video encoder 108 may encode the frames in the image stream as intra-frames or inter-frames. Generally, the video encoder 108 encodes the frames in the image stream according to a group of pictures, GOP, structure which specifies the order in which the intra- and inter-frames are arranged. By way of example, a GOP structure may be IBBPBBPBBPBBI, where I denotes an intra-frame, and B, and P denoted different types of inter-frames (B stands for bipredictive coded picture and P for predictive coded picture). Thus, an intra-frame may be followed by a sequence of inter-frames, which in turn are followed by another intra-frame. The length of the GOP structure, i.e., the distance between two intra-frames, may be fixed. In the above example, the length of the GOP structure is equal to twelve. Alternatively, the GOP structure may be dynamic, meaning that the video encoder 108 varies the GOP structure over time, e.g., based on the amount of motion in the image stream. However, in either case, the video encoder 108 determines the GOP structure a number of frames ahead, such that, for instance, the scheduling of the next intra-frame is known in advance.

The video camera 100 is provided with an IR-cut filter 110. The IR-cut filter 110 may be in different states, typically two states, between which it can switch. For example, the IR-cut filter 110 may be switched between a state in which it is on, meaning that it prevents the infrared light from reaching the image sensor 102, and a state in which it is off, meaning that it does not prevent infrared light from reaching the image sensor 102. The IR-cut filter 110 may be caused to switch between the states by switching its position in relation to the image sensor 102. For example, the IR-cut filter 110 may be connected to a motor which moves the filter from a position where it is located in front of the image sensor 102, to a position where it is not located in front of the image sensor 102, and vice versa. However, other solutions may also be envisaged, such as a filter which is constantly kept in front of the sensor, but whose optical properties are changed, e.g., by electrical or chemical activation, so as to turn the filter on and off.

The controller 112 serves to control the IR-cut filter 110, so as to cause it to switch state in a controlled manner. For example, the controller 112 may activate a motor to move the position of the filter 110, such that the motor is caused to move the position of the filter 110 in relation to the image sensor 101.

The controller 112 may comprise a processor 116, such as a digital signal processor or microprocessor, a receiver 118, and a memory 120. The memory 120 may serve as computer storage medium (or non-transitory computer readable medium) for storing computer code instructions which may be executed by the processor 116. In particular, the memory 120 may store instructions which, when executed, causes the controller 112 to carry out any method disclosed herein. As is well known to a person skilled in the art, the term computer storage medium includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The operation of the video camera 100, and, in particular, the controller 112 will now be described in more detail with reference to FIG. 1, FIG. 2, FIG. 3 and the flowchart of FIG. 4.

In step S02, the controller 112, e.g., by means of receiver 112, receives an indication to switch state of the IR-cut filter 110. By way of example, an indication to switch off the IR-cut filter 110 may be received.

The indication may be responsive to a detection of a change in lighting conditions in the scene of which the video camera captures images. For example, a lamp may have been turned on in the room where the camera is located, thereby causing a change in the lighting conditions. As a result, it may be desirable to switch on the IR-cut filter 110, so that colours in the images are not distorted by the infrared light.

The video camera 100 may therefore detect S02a a change in lighting conditions and generate the indication to switch states of the IR-cut filter 110 in response thereto. By way of example, the change in lighting conditions may be detected based on changes in brightness of images captured by the video camera 100. For example, the detection and the generation of the indication may be carried out by the image signal processor 106, or by the processor 116 of the controller 112. In more detail, a change in lighting conditions may be detected if the brightness in an image exceeds a threshold, or if the brightness in a sequence of images changes by more than a threshold during a time period.

The change in lighting conditions may also be detected by means of a light meter which is arranged to measure the light level in the scene. Upon the light level reaching above or below a certain level, an indication to switch state of the IR-cut filter may be generated and sent to the controller 112. Alternatively, the light level may be received by the receiver 118, and the processor 116 may then compare the light level to a threshold and generate an indication to switch the state of the IR-cut filter depending on if the light level reaches above, or falls below the threshold.

The change in light condition may also be detected based on a timer. For example, the video camera 100 may comprise a timer which follows the sun-rise and sun-set and indicates when the ambient light raises above a certain light level, and when the light falls below the certain light level. At such times, an indication to switch state of the IR-cut filter 110 may be generated, e.g., by processor 116.

The indication to switch state of the IR-cut filter 110 may also be responsive to detecting an event in images captured by the video camera 100, e.g., by dedicated hardware in the video camera 100. The event may relate to an object entering the scene. For example, if it is detected that a person enters the scene when IR-cut filter is off, an indication to switch on the IR-cut filter 110 may be generated, such that a colour image of the person may be generated for identification purposes 100.

The indication to switch state of the IR-cut filter 110 may also be received from a user input, such as from an operator of the video camera 100.

In step S04, the processor 116 of the controller 112 synchronizes a switch of state of the IR-cut filter 110 with a video encoding of frames captured by the video camera 100. For this purpose, the processor 116 may carry out sub-steps S04a-c.

In step S04a, the processor 116 determines when an intra-frame is scheduled to be encoded by the video encoder 108. Typically, the processor 116 determines when the next intra-frame after the receipt of the indication of step S02 is scheduled to be encoded. The determination may be based on a GOP structure used by the video encoder 108. The processor 166 may receive the GOP structure from the video encoder 108, e.g., via receiver 118, and on basis thereof determine when the next intra-frame is due. This is further exemplified on the time axis of FIG. 2 and FIG. 3, showing that the indication to switch filter state is received at a certain time. The frames following the received indication are scheduled to be encoded as PBBPBBPBBI. In this example, there are thus ten frames from the received indication of step S02 until the next frame that is scheduled to be encoded as an intra-frame.

In step S04b, the processor 116 identifies a frame which is a predetermined number of frames before the next intra-frame. The predetermined number may be greater or equal to zero.

If the predetermined number is equal to zero, the processor 116 will in step S04b identify the next intra-frame itself as the frame which is a predetermined number of frames before the next intra-frame. This is the case in the FIG. 3 example.

The predetermined number may be associated with a time required for image capturing parameters or image signal processing parameters to stabilise after a switch of position of the IR-cut filter. This is further illustrated in FIG. 2. As the state of the filter switches, the light condition at the image sensor 102 changes. As a result, and as further described above, the camera 100 automatically starts to adapt its parameter settings, such as focus, exposure, and white balance, to the new light condition. However, it takes some time before the parameters settle. The predetermined number is thus typically selected to correspond to the settling time of the parameters as empirically identified. In the example of FIG. 2, the predetermined number of frames is equal to seven, meaning that the frame which is seven frames before the next intra-frame is identified in step S04b.

In step S04c, the processor 116 controls the IR-cut filter to switch state when the video camera 100 is about to capture the frame which was identified in step S04b. In more detail, the processor 116 controls the IR-cut filter such that the switch of state is complete when the frame identified in step S04b is captured by the video camera 100. The processor 116 may for instance send a control signal to the IR-cut filter 110, or rather to an actuator of the IR-cut filter such as a motor, to switch state of the IR-cut filter 110. Depending on the time it takes for the IR-cut filter to switch state, the control signal may be sent in advance of the time when the frame identified in step S04b is to be captured, to make sure that the switch of state is complete before the frame is captured.

Figure 2:
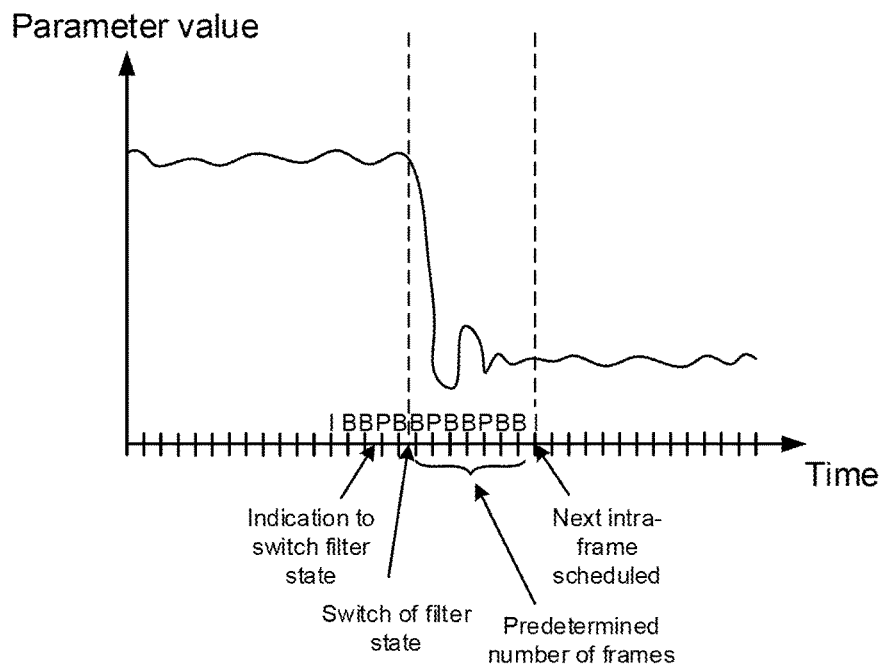
FIG. 2 is a schematic illustration of the temporal variation of an image capturing parameter or an image processing parameter of a video camera in connection to switching state of an IR-cut filter of a video camera according to embodiments.

Referring to the FIG. 2 example, the IR-cut filter 110 is controlled to switch state right before the camera captures the frame which is seven frames before the next intra-frame. Referring to the FIG. 3 example, the IR-cut filter 110 is controlled to switch state right before the camera captures the next intra-frame.

By performing steps S04a, S04b, S04c, the processor 116 may thus control the IR-cut filter to switch state when the video camera 100 is about to capture a frame which is a predetermined number of frames before a frame which is scheduled to be encoded as an intra-frame, thereby synchronizing the switch of state of the IR-cut filter with the video encoding of the camera 100.

Figure 3:
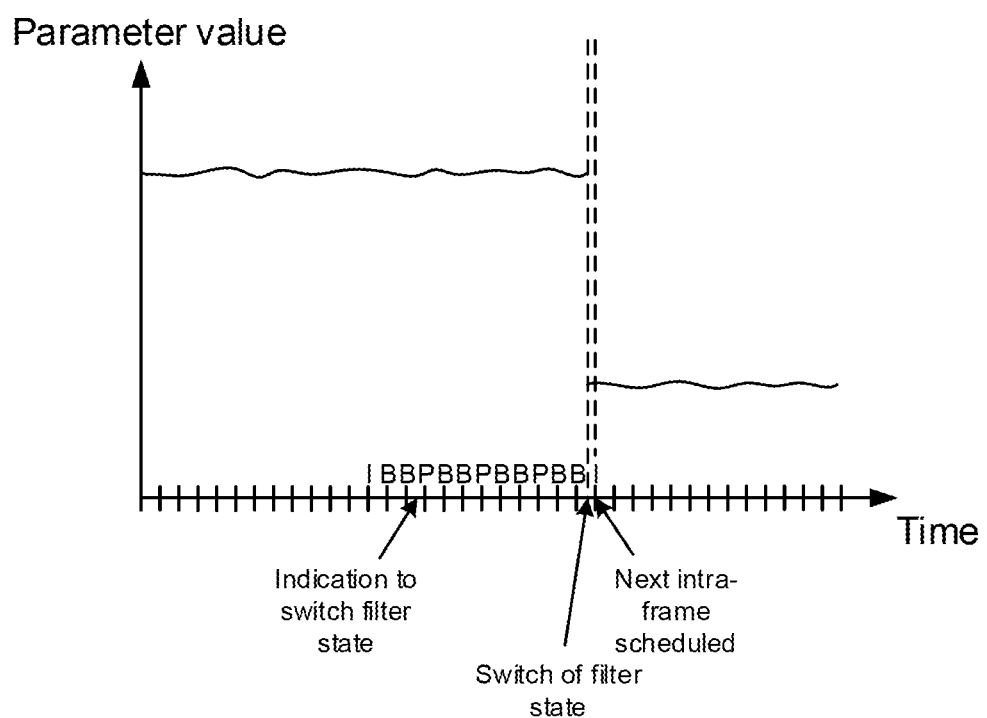
FIG. 3 is a schematic illustration of the temporal variation of an image capturing parameter or an image processing parameter of a video camera in connection to switching state of an IR-cut filter of a video camera in accordance with other embodiments.
Figure 4:
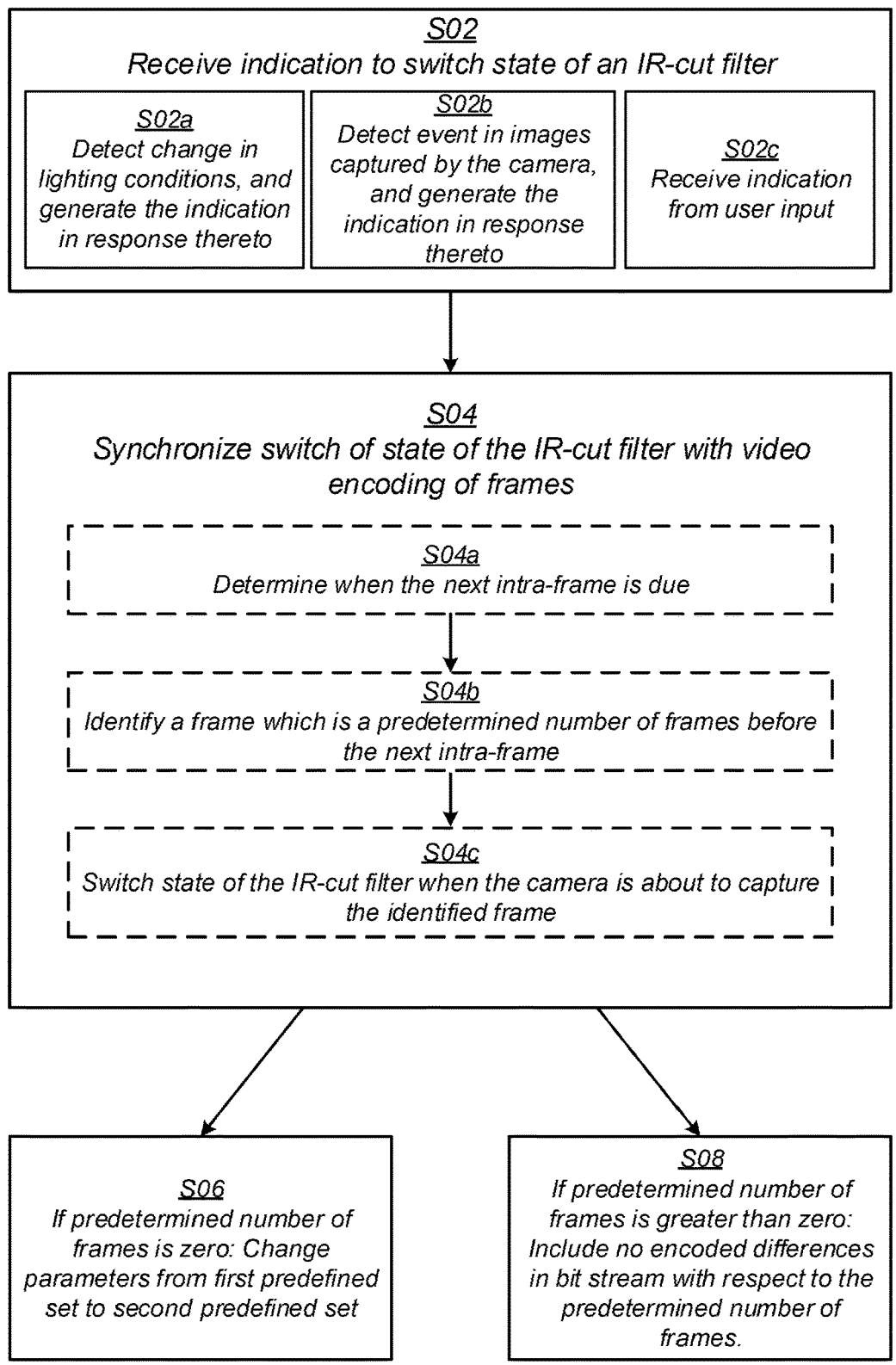
FIG. 4 is a flowchart of a method for controlling an infrared cut, IR-cut, filter of a video camera according to embodiments.

Returning to the example of FIG. 3, the IR-cut filter 110 switches state when the video camera 110 is about to capture the next intra-frame. In that case, there is no time window between the switch of state of the IR-cut filter 110 and the next intra-frame during which image capturing and image signal processing parameters are allowed to settle. The processor 116 may therefore further, in step S06, change at least one of image capturing parameters and image signal processing parameters from a first predefined set of values to a second predefines values, upon switching state of the IR-cut filter 110 from a first to a second state. The first predefined set of values correspond to the first state, and the second predefined set of values correspond to the second state. The first predefined set of values may include values of exposure, focus, and white balance which are preferred when the IR-cut filter 110 is in the first state. The second predefined set of values may include values of exposure, focus, and white balance which are preferred when the IR-cut filter 110 is in the second state. For example, at the same time as sending a control signal to the IR-cut filter 100, the processor 116 may send a control signal to the optical system 101, the image sensor 102, and/or the image signal processor 106, causing the image capturing parameters and image signal processing parameters from the first predefined set of values to the second predefines values. In this way, the parameters are automatically adapted to the new state of the IR-cut filter.

Returning to the example of FIG. 2, the IR-cut filter 110 is caused to switch state when the video camera 110 is about to capture a frame which is a predetermined number of frames before the next intra-frame. In that case, there is thus a time period between the switch of state of the IR-cut filter 110 and the next intra-frame during which parameters may settle. During that time period, corresponding to the predetermined number of frames before the next intra-frame, as few bits as possible is preferably spent on encoding. This is for the reason that the encoding will be costly, and the quality of the encoded images will be poor due to the abrupt change in the image frames caused by the switch of the IR-cut filter, and the variation of the parameters.

Instead of encoding the predetermined number of frames as inter-frames as scheduled, the controller 112 may in step S08 control the video encoder 108 to process the predetermined number of frames in another manner to save bits. For example, for the predetermined number of frames, the video encoder 108 may be controlled to include no encoded differences in the bitstream 114. As a result, in the decoded image stream, the video will hence be freezed between the switch of state of the IR-cut filter and the following intra-frame. This may be achieved in various ways. For example, the video encoder 108 may be controlled to include empty frames in the bitstream 114 at the positions of the predetermined number of frames. Another option is to encode the predetermined number of frames as being identical to the frame which precedes the switch of state of the IR-cut filter 110, e.g., by encoding the predetermined number of frames as P-skip frames, or by refraining from updating memory buffers of the video encoder 108. A still further option is to drop the predetermined number of frames, i.e., to not include them in the bitstream 114 at all.

It will be appreciated that a person skilled in the art can modify the above-described embodiments in many ways and still use the advantages of the present teachings as shown in the embodiments above. Thus, the present teachings should not be limited to the shown embodiments but should only be defined by the appended claims. Additionally, as the skilled person understands, the shown embodiments may be combined.

What is claimed is:

1. A method, performed in a video camera, for controlling an infrared cut, IR-cut, filter of the video camera, comprising:
   receiving an indication to switch state of an IR-cut filter of the video camera, wherein the IR-cut filter is switchable between an ON state in which it filters out infrared light and an OFF state in which it does not filter out infrared light; and
   synchronizing a switch of state of the IR-cut filter with a video encoding of frames captured by the video camera, such that the IR-cut filter is controlled to switch state when the video camera is about to capture a frame which is a predetermined number of frames before a frame which is scheduled to be encoded as an intra-frame.

2. The method of claim 1, wherein the predetermined number of frames is zero, such that the IR-cut filter is controlled to switch state when the video camera is about to capture a frame which is scheduled to be encoded as an intra-frame.

3. The method of claim 2, further comprising:
   upon switching state of the IR-cut filter from a first to a second state, wherein the first state is one of the ON state and the OFF state, and the second state is the other one of the ON state and the OFF state, changing at least one of image capturing parameters and image signal processing parameters of the video camera from a first predefined set of values, associated with the first state, to a second predefined set of values associated with the second state.

4. The method of claim 3, wherein the first and the second predefined set of values include parameters relating to at least one of exposure, focus, and white balance.

5. The method of claim 1, wherein the predetermined number of frames is greater or equal to one, the method further comprising:
encoding the frames captured by the video camera into a bitstream, such that the bitstream comprises no encoded differences for the predetermined number of frames before the frame which is scheduled to be encoded as an intra-frame.

6. The method of claim 5, further comprising:
encoding each of the predetermined number of frames before the frame which is scheduled to be encoded as an intra-frame as being identical to a frame which immediately precedes the switch in state of the IR-cut filter.

7. The method of claim 6, wherein the predetermined number of frames before the frame which is scheduled to be encoded as an intra-frame are encoded as P-skip frames.

8. The method of claim 1, wherein the step of synchronizing comprises:
determining when an intra-frame is scheduled to be encoded based on a group of pictures, GOP, structure used when encoding images captured by the camera.

9. The method of claim 1, wherein the step of synchronizing comprises:
identifying a frame which is the predetermined number of frames before the frame which is scheduled to be encoded as an intra-frame,
switching state of the IR-cut filter when the camera is about to capture the frame identified as being the predetermined number of frames before the frame which is scheduled to be encoded as an intra-frame.

10. The method of claim 1, wherein the step of receiving an indication to switch a state of an IR-cut filter of the video camera is responsive to detecting a change in lighting conditions in a scene of which the video camera captures images.

11. The method of claim 10, wherein a change in lighting conditions is detected based on changes in brightness of images captured by the video camera.

12. The method of claim 1, wherein the step of receiving an indication to switch a state of an IR-cut filter of the video camera is responsive to detecting an event in images captured by the video camera.

13. A controller for controlling an infrared cut, IR-cut, filter of a video camera, comprising:

a receiver configured to receive an indication to switch a state of an IR-cut filter of the video camera, wherein the IR-cut filter is switchable between an ON state in which it filters out infrared light and an OFF state in which it does not filter out infrared light; and
a processor configured to synchronize a switch of state of the IR-cut filter with a video encoding of frames captured by the video camera, such that the IR-cut filter is controlled to switch state when the video camera is about to capture a frame which is a predetermined number of frames before a frame which is scheduled to be encoded as an intra-frame.

14. A video camera comprising:
an image sensor;
an infrared cut, IR-cut, filter adapted to switch state so as to either prevent or not prevent IR light from reaching the image sensor;
a video encoder configured to encode images captured by the video camera via the image sensor; and
a controller for controlling the IR-cut filter comprising:
a receiver configured to receive an indication to switch a state of an IR-cut filter of the video camera, wherein the IR-cut filter is switchable between an ON state in which it filters out infrared light and an OFF state in which it does not filter out infrared light; and
a processor configured to synchronize a switch of state of the IR-cut filter with a video encoding of frames captured by the video camera, such that the IR-cut filter is controlled to switch state when the video camera is about to capture a frame which is a predetermined number of frames before a frame which is scheduled to be encoded as an intra-frame.

15. A non-transitory computer readable storage medium having instructions stored thereon which, when executed by a device having processing capabilities, causes the computing device to perform operations comprising:
receiving an indication to switch state of an IR-cut filter of the video camera, wherein the IR-cut filter is switchable between an ON state in which it filters out infrared light and an OFF state in which it does not filter out infrared light; and
synchronizing a switch of state of the IR-cut filter with a video encoding of frames captured by the video camera, such that the IR-cut filter is controlled to switch state when the video camera is about to capture a frame which is a predetermined number of frames before a frame which is scheduled to be encoded as an intra-frame.

* * * * *